United States Patent [19]
Imai et al.

[11] Patent Number: 4,710,830
[45] Date of Patent: Dec. 1, 1987

[54] SEALED DISC DRIVE ASSEMBLY WITH INTERNAL AIR FILTER

[75] Inventors: Hiroshi Imai; Kouichi Yoshioka, both of Hyogo, Japan

[73] Assignee: Mitsubishi Denki Kabushiki Kaisha, Tokyo, Japan

[21] Appl. No.: 921,504

[22] Filed: Oct. 22, 1986

[30] Foreign Application Priority Data

Oct. 24, 1985 [JP] Japan .................................. 60-238660

[51] Int. Cl.$^4$ ............................................. G11B 5/012
[52] U.S. Cl. ........................................... 360/97; 360/98
[58] Field of Search .................................. 360/97–99, 360/133, 135, 102–103

[56] References Cited
U.S. PATENT DOCUMENTS 3,731,291 5/1973 Walsh .................................... 360/98
4,369,475 1/1983 Ho et al. ................................ 360/97
4,418,369 11/1983 Applequist et al. ................... 360/98
4,471,395 9/1984 Beck et al. ............................ 360/98
4,562,499 12/1985 Mizoshita ............................. 360/98
4,626,941 12/1986 Sawada et al. ....................... 360/97

Primary Examiner—John H. Wolff
Attorney, Agent, or Firm—Sughrue, Mion, Zinn, Macpeak and Seas

[57] ABSTRACT

An air filter assembly 45, 46, 47 is disposed inside a hermetically sealed housing 1 which encloses fixed hard discs 2 with its intake directly facing a spiralling centrifugal air flow generated by the rotating discs. An air guide or duct 71, 72, 73 communicates the clean air leaving the filter outlet with the low pressure area at the center of the discs. An increased pressure differential across the filter and improved filtration efficiency results. Internal partitions 62, 64 may also be provided to channel the air flow towards the filter inlet.

4 Claims, 11 Drawing Figures

SEALED DISC DRIVE ASSEMBLY WITH INTERNAL AIR FILTER

BACKGROUND OF THE INVENTION

This invention relates to a fixed hard disc drive assembly including a hermetically sealed housing having an air cleaning means disposed therein.

Hard disc storage media is extensively used with computer equipment for data storage and data handling applications, but when such high storage density discs are employed care must be taken to minimize dust and the like. In a hard disc drive assembly the read-write heads float on a thin layer of air very close to the disc surface during the read-write operations, and any particles on the surface of the disc will interfere with the spacing of the heads and prevent their proper operation. In many instances, dust particles or the like may lodge between the rapidly spinning disc surface and the associated read-write heads and cause the physical destruction of these delicate components. The hard discs and the associated read-write heads are thus usually enclosed within a hermetically sealed envelope or housing, and an air cleaning system is disposed within the housing to provide a cleansing air circulation over the disc surfaces.

A conventional fixed hard disc drive assembly having an air cleaning system is shown in FIG. 1, wherein a plurality of fixed hard discs 2 (only one is shown) are mounted on the rotor of a spindle motor 3 for counter clockwise rotation. Read-write heads 5 are disposed proximate the surface of the discs 2, mounted on coupled arms 51, 52 driven by an actuator (not shown) to accurately position the heads. The foregoing structure is enclosed within a hermetically sealed housing 1. An air filter assembly 4 is disposed at one end of the rectangular portion of the housing, with its intake side facing towards the air flow generated by the rotation of the discs. An internal baffle block 6 helps to channel the air toward the filter inlet.

When the spindle motor 3 and the hard discs 2 are driven at high velocities, air flows radially and circumferentially outwardly, in a spiralling manner, due to the pressure difference caused by the centrifugal pumping effect of the rotating discs. A layer of cleansing air thus flows over the surfaces of the discs. The centrifugal action gives a circumferential component of velocity to the air which forces it into the space 61 between the block 6 and the housing 1, and then into the intake of the air filter 4. The cleansed air exiting the filter travels as shown by the arrows 63 to return to the low pressure area at the center of the discs, thus establishing a continuous air flow cycle.

FIG. 2 shows another conventional fixed hard disc drive assembly, wherein the air filter 4 is disposed directly in the path of the air flow and the baffle block 6 shown in FIG. 1 is dispensed with.

FIGS. 3(a) and 3(b) show a further conventional disc drive assembly, wherein the intake side of the air filter 4 faces downwardly and an air guide or duct 7 is disposed between the outlet side of the filter and the center portion of the discs.

In these conventional arrangements the pressure difference between the intake and outlet of the air filter is relatively small, which results in a low filtration efficiency.

SUMMARY OF THE INVENTION

In accordance with the present invention the pressure differential across the filter and thus the filtration efficiency are improved by disposing the filter intake directly in the path of and perpendicular to the spiralling centrifugal air flow generated by the rotating discs, and ducting the filter outlet back to the low pressure zone at the centers of the discs. Partition walls may also be provided to more effectively channel the air flow into the filter inlet.

BRIEF DESCRIPTION OF THE DRAWINGS

FIG. 3 (a) is a plan view of a further conventional disc drive assembly,

FIG. 3(b) is a sectional view taken along line IIIb—IIIb of

DETAILED DESCRIPTION OF THE PREFERRED EMBODIMENTS

Figure 1:
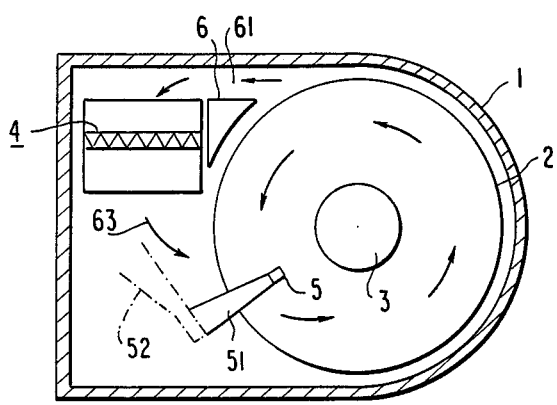
FIG. 1 is a plan view of a conventional disc drive assembly.
Figure 2:
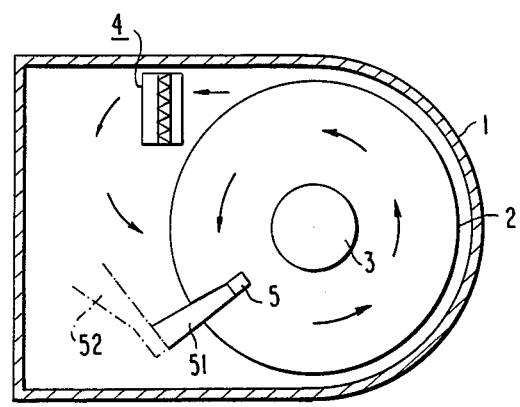
FIG. 2 is a plan view of another conventional disc drive assembly.
Figure 3A:
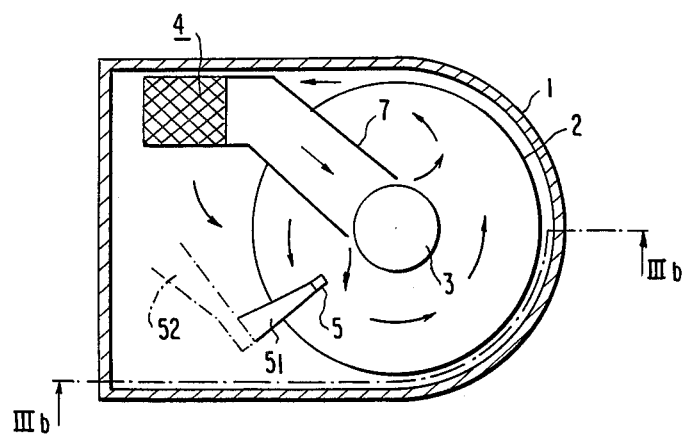
FIG. 3(a)
Figure 3B:
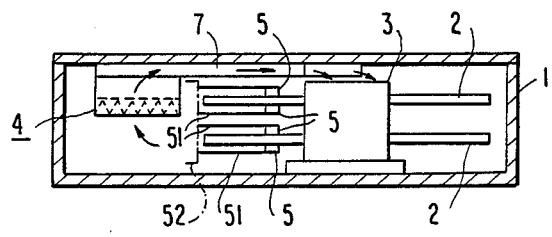
Figure 4A:
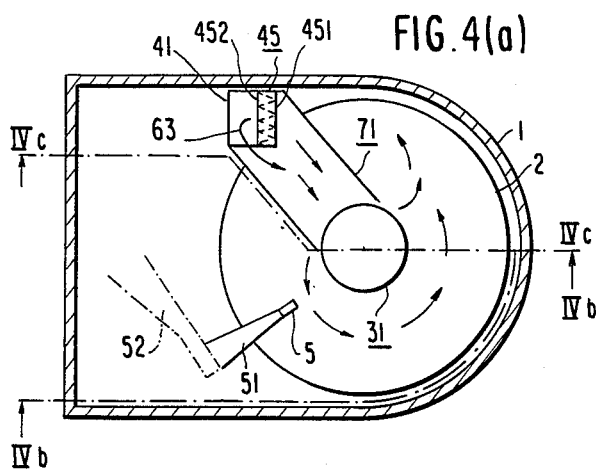
FIG. 4(a) is a plan view of a disc drive assembly in accordance with one embodiment of the present invention.
Figure 4B:
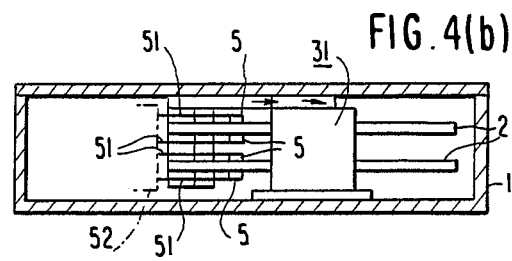
FIG. 4(b) is a sectional view taken along line IVb—IVb of FIG. 4(a)
Figure 4C:
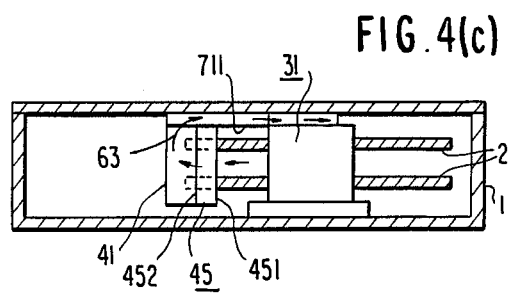
FIG. 4(c) is a sectional view taken along line IVc—IVc of FIG. 4(a)

Referring to FIGS. 4(a), (b) and (c), two fixed hard discs 2 are mounted on the rotor of a spindle motor 31 and are driven in a counter clockwise direction. Four read-write heads 5 are individually disposed near the surfaces of the discs, mounted on coupled positioning arms 51, 52 driven by an actuator (not shown).

An air filter assembly 45 is disposed near the circumference of the discs 2 with its intake side 451 facing the direction of the air flow generated by the rotating discs. Accordingly, the air arriving at the filter intake is under a dynamic pressure. A box member 41 is disposed to support the air filter assembly 45, and serves to lead the clean air exiting the filter into an air guide or duct 71 which extends from the outlet side 452 of the filter to the center portion of the hard discs 2. The air guide has a bottom plate 711 which partitions it from the filter intake. The foregoing components are enclosed by a hermetically sealed housing 1.

When the spindle motor 31 and the hard discs 2 are rotated at a high velocity, air flows radially and circumferentially outwardly due to the pressure difference caused by the centrifugal pumping effect of the discs. This gives a circumferential velocity component to the air which carries it into the intake side 451 of the filter assembly 45. The clean air leaving the filter is introduced through the box member 41 into the air guide 71 as shown by the arrows 63, through which it flows to the low pressure area at the center of the discs. As the outlet side 452 of the filter is connected with the center of the low pressure area by the air guide 71, and as the intake side 451 directly receives the high pressure air flow generated by the rotating discs, the pressure difference between the intake and the outlet of the air filter assembly 45 is substantially greater than in the conventional arrangements and the filtration efficiency is attendantly increased.

Figure 5A:
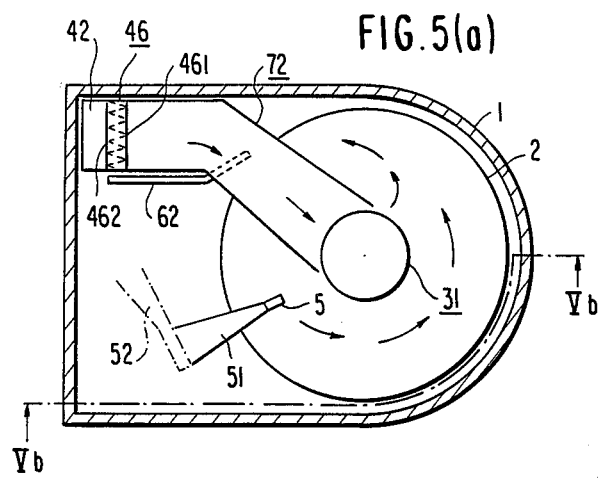
FIG. 5(a) is a plan view of a disc drive assembly in accordance with another embodiment of the invention.
Figure 5B:
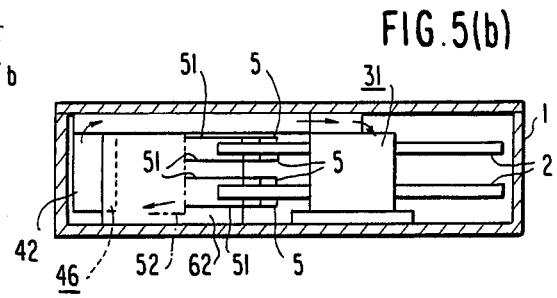
FIG. 5(b) is a sectional view taken along line Vb—Vb of FIG. 5(a)

Another embodiment of the invention is shown in FIGS. 5(a) and 5(b), wherein a partition plate 62 is disposed between the air filter assembly 46 and the discs 2 to guide the air flow generated by the rotating discs to the intake side 461 of the filter in combination with a box member 42. An air guide 72 is disposed between the outlet side 462 of the filter assembly and the low pressure area at the center of the discs. This embodiment also achieves an increased pressure differential and improved filtration efficiency.

Figure 6A:
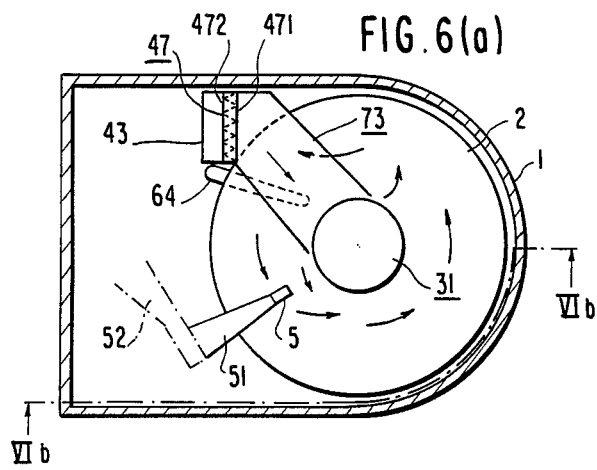
FIG. 6(a) is a plan view of a drive assembly in accordance with a further embodiment of the invention.
Figure 6B:
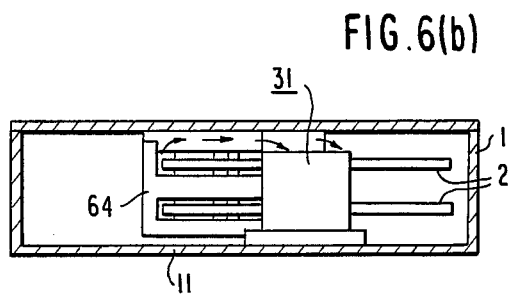
FIG. 6(b) is a sectional view taken along line VIb—VIb of FIG. 6(a).

FIGS. 6(a) and 6(b) show a further embodiment, wherein a fingered partition member 64 is interleaved between each of the discs 2 and the bottom wall 11 of the housing 1 to guide the air flow generated by the rotating discs to the intake side 471 of the air filter assembly 47. An air guide 73 is disposed between the outlet side 472 of the filter and the low pressure area at the center of the discs. The same increased pressure difference and filtration efficiency benefits attach as described above.

Of course, any number of discs can be employed and the spindle motor 31 can be disposed outside of the housing with its drive shaft sealingly extending thereinto.

What is claimed is:

1. A disc drive assembly, comprising:
    (a) a hermetically sealed housing (1),
    (b) at least one hard magnetic storage disc (2) disposed within the housing and coupled to rotational drive means (31),
    (c) an air filter (45; 46; 47) disposed within the housing with an intake side (451; 461; 471) thereof oriented directly in the path of and perpendicular to a spiralling, centrifugally pumped air flow generated by the rotating disc, and
    (d) an air guide (71; 72; 73) disposed within the housing for ducting clean air from an outlet side (452; 462; 472) of the filter to a low pressure zone proximate the center of the disc such that a pressure differential is established across the filter to promote a continuous cyclical air flow therethrough and the attendant removal of contaminating particles of dust and the like, wherein the intake side of the filter extends over substantially the full height of the housing, and further comprising a flue box (41; 42; 43) disposed within the housing enclosing the outlet side of the filter and establishing open communication with an inlet of the air guide.

2. A disc drive assembly according to claim 1, wherein the housing closely surrounds upper and lower surfaces of the disc and one-half of the outer periphery thereof to promote said spiralling, centrifugally pumped air flow.

3. A disc drive assembly according to claim 1, further comprising a continuous partition wall (62) disposed within the housing between the outer periphery of the disc and the intake side of the filter and defining, together with a bottom wall and a side wall of the housing and a bottom wall of the air guide, a flow channel for directing centrifugally pumped air into the filter intake side.

4. A disc drive assembly according to claim 1, further comprising a partition wall (64) disposed within the housing between a central portion of the disc and the intake side of the filter and defining, together with a bottom wall and a side wall of the housing and a bottom wall of the air guide, a flow channel for directing centrifugally pumped air into the filter intake side, said partition wall having a slot therein to accommodate a portion of the disc.

* * * * *